United States Patent Office 3,242,000
Patented Mar. 22, 1966

3,242,000
IMPREGNATED CARBONIZED ACRYLIC TEXTILE PRODUCT AND METHOD FOR PRODUCING SAME
Jack A. Lynch, Spartanburg, S.C., assignor to Deering Milliken Research Corporation, Spartanburg, S.C., a corporation of Delaware
No Drawing. Filed Aug. 30, 1963, Ser. No. 305,861
5 Claims. (Cl. 117—46)

This invention relates to heat resistant textile materials and more specifically to carbonized textile materials impregnated with compounds containing refractory metal cations.

Heat resistant fabrics have recently become of vital importance for use in missiles which are subjected to the effects of excess heat build-up at very high speeds. Since the heat resistance of carbon except in the presence of an oxidizing atmosphere is almost perfect, efforts have been made to produce carbonized fabrics having increased oxidation or flame resistance. Fabrics of this type when employed as a laminate between sheets of organic polymeric materials have found application as liners for missile nose cones and missile exhaust orifices. Carbonization of fabrics, however, results in extreme weight loss, the loss in weight often being correlated to losses in flexibility in the carbonized fabric.

It is therefore an object of this invention to provide a carbonized fabric having increased oxidation or flame resistance.

It is another object of this invention to provide a method for the production of a carbonized fabric wherein carbonization is accomplished without extreme losses in weight and flexibility.

These and other objects of the invention will become apparent from the following description.

In accordance with this invention it has now been discovered that a textile material having high oxidation or flame resistance may be obtained by impregnating a fabric with a solution of a compound containing refractory metal cations and then carbonizing the refractory metal cation impregnated fabric in a suitable atmosphere whereby the weight loss due to the carbonization operation will be substantially reduced and the flexibility of the carbonized fabric increased.

It should be understood that the term refractory as employed herein is meant include in addition to those compounds considered refractory in the classical sense, those compounds which have thermal stability at temperatures of 300° C. or greater. Compounds which have been found to be suitable for the preparation of solutions containing refractory metal cations are compounds such as for instance:

$Al(C_2H_3O_2)_2$
$Al(NO_3)_3 \cdot 9H_2O$
$Al_2(SO_4)_3$
$Ba(C_2H_3O_2)_2$
$BaCO_3$
$BaNO_3$
$BaSiO_3$
$BeCl_2$
$BCl_3$
$Cd(C_2H_3O_2)_2$
$Ca(C_2H_3O_2)_2$
$Ca(C_2H_3O_2)_2 \cdot H_2O$
$CaCl_2$
$Ce(C_2H_3O_2)_3$
$CsCl$
$Cs_2CO_4$
$Cr(C_2H_3O_2)_6 \cdot 2H_2O$
$CrC_2O_4 \cdot H_2O$
$CoCl$ $Co(C_2H_3O_2)_2 \cdot 4H_2O$
$Cu(C_2H_3O_2)_2$
$Fe(NO_3)_3 \cdot 9H_2O$
$(Fe)_2(SO_4)_3 \cdot 9H_2O$
$FeSiO_3$
$Fe(OH)(C_2H_3O_2)_2$
$LaCl_3 \cdot 7H_2O$
$Pb(C_2H_3O_2)_2$
$LiC_2H_3O_2 \cdot 2H_2O$
$Mg(C_2H_3O_2)_2$
$Mn(C_2H_3O_2)_2$
$MoCl_4$
$Ni(C_2H_3O_2)_2$
$SnCl_2 \cdot 2H_2O$
$TaF_5$
$TlBr_3 \cdot 4H_2O$
$ThBr_4$
$ThCl_4$
$TiCl_4$ $TiCl_3$
$Ti(C_2O_4)_2$
$WCl_2$
$WCl_4$
$UBr_4$
$UCl_4$
$V_2O_4(SO_3)_3 \cdot 16H_2O$ $Y_2O_3$
$Y_2(SO_4)_3$
$Zn(Z_2H_3O_2)_2$
$ZnSiF_6 \cdot 6H_2O$
$ZrBr_4$
$Zr(C_2H_3O_2)_4$ and the sodium, potassium and ammonium salts of silicates, aluminates and vanadates, etc.

Fabrics suitable for use in this invention, that is to say fabrics which are suitable for carbonizing operations are fabrics selected from the group consisting of viscose rayon fabrics, cotton fabrics and polyacrylic fiber fabrics. The solution of the compounds containing refractory metal cations may be applied by any of the means well known to the impregnating art such as for instance spraying or padding. The solvent for the compounds containing refractory metal cations may be water or any compatible organic solvent or combinations of water and miscible organic solvents. The compounds containing refractory metal cations should be present in the impregnating solution in quantities such that from about 1% to about 100% pickup of compound is effected based on the dry weight of the fabric and preferably from about 25% to about 50% based on the dry weight of the fabric.

Because a decrease in the density of a fibrous material renders the material more receptive to impregnants and hence more receptive to greater amounts of the compounds having refractory metal cations, it is preferred that the fibers be swollen prior to impregnation.

In general, the carbonization or pyrolysis of the coated fabric is carried out by placing the fabric in a Hoskins oven or other apparatus having the ability to attain the desired temperature range in the proper atmosphere and heating at a temperature of from about 300° C. to about 3,000° C. or higher. When the fiber being carbonized or pyrolyzed is a cellulosic fiber such as for instance viscose rayon or cotton, it is essential that the carbonization be carried out in an inert atmosphere such as for instance a nitrogen or argon atmosphere or in a reducing atmosphere such as for instance carbon monoxide or hydrogen. Where, however, the fiber being carbonized is an arcylic fiber, it is preferred that carbonization be conducted in an atmosphere which contains at least some oxygen. It has been found that an oxygen level of from about 10% to about 20% is to be preferred where the fiber being carbonized is an acrylic fiber such as for instance, Orlon (polyacrylic fiber). When an oxygen containing atmosphere is employed for the carbonization operation, it is preferred that temperatures of from about 180° C. to about 550° C. be employed. The period of time during which the fabrics are subjected to carbonization operations is dependent, of course, upon the exact temperature employed, however, a period of about one hour is usually sufficient to effect that degree of carbonization which is desired.

The following specific examples for the preparation of the refractory metal oxide coated carbonized fabric of this invention are given for purposes of illustration and should not be considered as limiting the spirit or scope of this invention.

*Example I*

An aqueous solution of zirconium acetate is prepared by dissolving 10 grams of zirconium acetate in 75 grams of water. A viscose rayon fabric swatch is then soaked in water until the rayon fibers are in a swollen condition. The zirconium acetate solution is then sprayed onto the viscose rayon fabric swatch. The sample is then dried and placed in an electric oven which had previously been flushed with nitrogen gas. The temperature of the oven is raised to 800° C. over a two-hour period and then held at 800° C. for at least fifteen minutes. The fabric is then allowed to cool while being maintained under a steady nitrogen gas flow. The fabric is found to have undergone a 62.9% weight loss from the pyrolysis operation and to have good flame resistance.

*Example II*

A titanium chloride solution is prepared by dissolving 10 grams of titanium chloride in 70 grams of water. A swatch of cotton fabric is then treated with ethanolamine in order to swell the fibers and is then dipped into the titanium chloride solution. The fabric is then dried and placed in an electric oven which has previously been flushed with nitrogen gas. The temperature of the oven is raised to 800° C. over a two-hour period and held at 800° C. for at least 15 minutes. The fabric is then allowed to cool while being maintained under a steady nitrogen gas flow. The fabric is found to have undergone a 71.2% weight loss from the pyrolysis operation, the fabric having good flame resistance.

*Example III*

A 5% isobutyl titanate solution is prepared employing isopropanol as a solvent. A swatch of viscose fabric is then immersed into the isobutyl titanate solution for 30 minutes at room temperature. At the end of the 30 minutes immersion period, water is added to force titanium dioxide formation within the viscose rayon fibers. The sample is then air dried and placed in an electric oven which has previously been flushed with nitrogen gas. The temperature of the oven is raised to 800° C. over a two-hour period and held at 800° C. for at least 15 minutes. The fabric is then allowed to cool while being maintained under a steady nitrogen gas flow. The resultant titanium oxide carbonized fabric is found to have a greater degree of flexibility than a similar carbonized fabric which has not been subjected to an impregnation operation.

*Example IV*

A 10% aqueous solution of molybdenum chloride is prepared. A swatch of cotton fabric is then immersed in a molybdenum chloride solution for about 20 minutes at about room temperature. At the end of the immersion period, the fabric is air dried and placed in an electric oven which has previously been flushed with carbon monoxide gas. The temperature of the oven is raised to 1,000° C. over a two-hour period and held at 1,000° C. for at least 15 minutes. The fabric is then allowed to cool while being maintained under a steady carbon monoxide gas flow. The resultant fabric is found to have a much higher degree of flexibility than a cotton fabric which was carbonized in a similar manner but not subjected to the molybdenum chloride impregnation operation. The fabric was also found to contain traces of molybdenum metal in the refractory metal compound in the fibers.

The improvement to be had in the flexibility or extensibility, extensibility being in itself a measurement of flexibility, for the carbonized textile materials impregnated with the compounds having refractory metal cations is determined by conducting tests on fill fibers of refractory metal cation impregnated carbonized textile materials compared with fill fibers of unimpregnated but similarly carbonized textile materials. Extensibility tests were performed on carbonized fabrics by removing fill yarns. The tests are carried out by locking individual strands of fill yarns in the jaws of an Instron testing machine. The secured sample is then loaded with the weight of 0.01 gram/grex. The load is then removed and the procedure repeated for two additional cycles. On completing the third cycle, measurements are taken to determine extensibility. Tests conducted in this manner showed, for instance, that the sample prepared according to Example I given herein had a 20.00% elongation. A corresponding viscose control fabric which was subjected to the same carbonizing conditions as set forth in Example I but which was not impregnated with zirconium oxide had 6.54% elongation. It may be readily seen from the foregoing data that a considerable improvement is obtained in extensibility by impregnating the fabric with compounds containing refractory cations prior to carbonization or pyrolysis treatment.

Having thus disclosed the invention, what is claimed is:

1. A method for the preparation of carbonized textile materials having improved elongation properties comprising impregnating an acrylic fiber textile material with a solution containing at least one compound having a refractory metal cation said impregnating operation being conducted in a manner such that a pickup of from about 1% by weight to about 100% by weight based on the dry weight of the fabric is obtained and then carbonizing the impregnated material in an atmosphere containing at least some oxygen at a temperature of from about 300° C. to about 3000° C.

2. The method of claim 1 wherein said compound containing a refractory metal cation is present in quantities such that about 25% by weight to about 50% by weight pickup based on the dry weight of the fabric is effected.

3. The method of claim 1 wherein said atmosphere contains from about 10% to about 20% by volume oxygen.

4. The method of claim 1 wherein said carbonizing is conducted at temperatures of less than about 550° C.

5. A heat resistant textile material comprising an acrylic fiber textile product which has been impregnated with a refractory metal cation containing compound and carbonized in situ.

References Cited by the Examiner

UNITED STATES PATENTS

| | | | |
|---|---|---|---|
| 378,258 | 2/1888 | Mace | 8—116 |
| 393,391 | 11/1888 | Ram | 8—116 |
| 539,838 | 5/1895 | Trobach | 8—116 |
| 599,306 | 2/1898 | Voss | 8—116 |
| 626,460 | 6/1899 | Edison | 8—116 |
| 683,085 | 9/1901 | Voelker | 8—116 |
| 1,834,339 | 12/1931 | Dreyfus et al. | 117—143 |
| 2,525,049 | 10/1950 | Signaigo | 8—116 |
| 2,741,569 | 4/1956 | Stanford | 117—46 |
| 3,011,981 | 12/1961 | Soltes | 8—116 |
| 3,027,222 | 3/1962 | Wilkinson. | |
| 3,071,637 | 1/1963 | Horn et al. | 117—228 |
| 3,092,519 | 6/1963 | Olson. | |
| 3,107,152 | 10/1963 | Ford et al. | 8—116 |
| 3,125,404 | 3/1964 | Crawley. | |

OTHER REFERENCES

Vosburgh: "The Heat Treatment of Orlon Acrylic Fiber to Render It Fireproof," Textile Research Journal, vol. 30, No. 1, 1960, pp. 882–896. TS 1300 T 33.

WILLIAM D. MARTIN, *Primary Examiner.*